(12) United States Patent
Kurosawa et al.

(10) Patent No.: US 10,266,323 B2
(45) Date of Patent: Apr. 23, 2019

(54) EXTERNAL MEMBER FOR CONTAINER LID

(71) Applicant: TOYO SEIKAN GROUP HOLDINGS, LTD., Tokyo (JP)

(72) Inventors: Takahiro Kurosawa, Yokohama (JP); Toshiyuki Arai, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 482 days.

(21) Appl. No.: 15/027,269

(22) PCT Filed: Oct. 7, 2014

(86) PCT No.: PCT/JP2014/076855
§ 371 (c)(1),
(2) Date: Apr. 5, 2016

(87) PCT Pub. No.: WO2015/053288
PCT Pub. Date: Apr. 16, 2015

(65) Prior Publication Data
US 2016/0244227 A1    Aug. 25, 2016

(30) Foreign Application Priority Data

Oct. 8, 2013   (JP) ................................. 2013-211353

(51) Int. Cl.
*B65D 41/32*   (2006.01)
*B65D 51/18*   (2006.01)
(Continued)

(52) U.S. Cl.
CPC ........... *B65D 55/028* (2013.01); *B65D 41/34* (2013.01); *B65D 51/18* (2013.01); *B65D 51/245* (2013.01);
(Continued)

(58) Field of Classification Search
CPC ...... B65D 55/028; B65D 41/34; B65D 51/18; B65D 51/245; B65D 2203/10;
(Continued)

(56) References Cited

U.S. PATENT DOCUMENTS 3,905,503 A * 9/1975 Fraze ................... B65D 17/163
215/255
4,433,790 A * 2/1984 Gibson ................ B65D 50/061
215/206
(Continued)

FOREIGN PATENT DOCUMENTS

CN    202807381 U    3/2013
JP    58-010305 B2   2/1983
(Continued)

OTHER PUBLICATIONS

Communication dated Oct. 27, 2016 from the State Intellectual Property Office of the P.R.C. in counterpart Application No. 201480055760.0.
(Continued)

*Primary Examiner* — J. Gregory Pickett
*Assistant Examiner* — Niki M Eloshway
(74) *Attorney, Agent, or Firm* — Sughrue Mion, PLLC

(57) ABSTRACT

In connection with an information transmission member-equipped external member (outer lid member) to be mounted on a container lid, the opening of the container lid and the destruction of the information transmission member are carried out by a series of operations. Upon rotational movement of an opening/closing cover (3) and an outer cover (4) relative to each other, the opening/closing cover (3) is raised to destroy a predetermined site of an IC tag (40), and a tamper-evident bottom section (38) is cut off, whereby the outer cover (4) is separated from the opening/closing cover (3), and the opening/closing cover (3) is opened (Continued)

sideways to make the opening/closing cover (3) detachable from the container lid.

9 Claims, 11 Drawing Sheets

(51) Int. Cl.
    *B65D 55/02* (2006.01)
    *G06K 19/077* (2006.01)
    *B65D 41/34* (2006.01)
    *B65D 51/24* (2006.01)

(52) U.S. Cl.
    CPC . *G06K 19/07758* (2013.01); *G06K 19/07798* (2013.01); *B65D 2203/10* (2013.01); *B65D 2251/0015* (2013.01); *B65D 2251/0078* (2013.01)

(58) Field of Classification Search
    CPC .... B65D 2251/0015; B65D 2251/0078; G06K 19/07758; G06K 19/07798
    USPC ......... 220/214, 257.1, 258.1, 258.5; 215/253
    See application file for complete search history.

(56) References Cited

U.S. PATENT DOCUMENTS

| | | | | |
|---|---|---|---|---|
| 4,874,101 | A | 10/1989 | Zalut | |
| 4,984,699 | A * | 1/1991 | Zalut | B65D 51/18 215/231 |
| 4,984,700 | A * | 1/1991 | Knickerbocker | B65D 51/18 215/204 |
| 5,269,429 | A * | 12/1993 | Schumacher | B65D 51/002 215/249 |
| 2001/0011649 | A1* | 8/2001 | Fujie | B65D 47/103 215/256 |
| 2004/0144786 | A1* | 7/2004 | Chmela | B65D 51/18 220/257.1 |
| 2006/0049948 | A1 | 3/2006 | Chen et al. | |
| 2006/0180650 | A1 | 8/2006 | Claessens et al. | |
| 2007/0062903 | A1* | 3/2007 | Norman | B65D 51/18 215/274 |
| 2008/0238675 | A1* | 10/2008 | Yang | B65D 55/028 340/572.1 |
| 2008/0314900 | A1 | 12/2008 | Biesecker et al. | |
| 2009/0212954 | A1* | 8/2009 | Adstedt | B65D 39/00 340/572.8 |
| 2015/0186770 | A1* | 7/2015 | Arai | B65D 55/02 235/492 |

FOREIGN PATENT DOCUMENTS

| | | |
|---|---|---|
| JP | 05-035077 Y2 | 9/1993 |
| JP | 2005-222452 A | 8/2005 |
| JP | 2006-123917 A | 5/2006 |
| JP | 2009-001326 A | 1/2009 |
| JP | 4489082 B2 | 6/2010 |
| JP | 2011-213378 A | 10/2011 |
| JP | 2011-227752 A | 11/2011 |
| JP | 3182220 U | 3/2013 |

OTHER PUBLICATIONS

International Search Report of PCT/JP2014/076855 dated Dec. 22, 2014.

* cited by examiner

EXTERNAL MEMBER FOR CONTAINER LID

TECHNICAL FIELD

This invention relates to an external member for a container lid, the external member making it possible to mount an information transmission member, such as an IC tag, which communicates product information or the like on contents within a container, on the container lid by retrofitting.

BACKGROUND ART

Recently, technologies for information display using IC tags have been put to use. The IC tag is also called an RFID (radio frequency identification) tag, which is an ultra-small communication terminal in the shape of a tag (shipping tag) formed by embedding an IC chip storing predetermined information in a dielectric material, such as resin or glass, together with a radio antenna. From such an IC tag, product information stored in the IC chip is read off by radio communication. The memory of the IC chip, for example, is advantageous in that it can record several hundred bytes of data and can record producer information and many pieces of product information. An operator can read the recorded information from the IC tag in a non-contact manner. The IC tag is free from problems such as wear, and is advantageous in that it can be processed into a shape conformed to the form of a commercial product, and can be miniaturized or slimmed down.

For example, Patent Document 1 discloses that when an upper lid coupled to an external outer lid member covering a container lid to be mounted on a container mouth is opened, an antenna circuit provided in the outer lid member is cut, whereby the opening can be recognized. This Patent Document 1 teaches that producer information or product information can be read from the IC tag, or enables the opening of the lid to be recognized by detecting from an external reader the fact that the circuit of the IC tag is cut. Patent Document 1, however, still involves problems to be solved.

PRIOR ART DOCUMENTS

Patent Documents

Patent Document 1: JP-A-2011-213378

SUMMARY OF THE INVENTION

Problems to be Solved by the Invention

With the means of Patent Document 1, the IC tag is provided on the outer lid member provided separately from the container lid sealing the container mouth. The operation of opening the outer lid member needs to be performed by opening the upper lid on the outer lid member to destroy the IC tag, and then further breaking a score formed in an outer peripheral wall of the outer lid member to remove the outer lid member from the container lid. With the means of Patent Document 1, as noted above, actions until exposure of the container lid at the surface are complicated, it takes time to open the outer lid member, and users need to be informed of a detailed opening operation. To compensate for such shortcomings, a further improvement is desired.

Furthermore, the outer lid member of Patent Document 1 is used to be paired with the container lid, which is mounted on the container mouth. If the diameter or height of the container lid differs, the outer lid member does not match such a different container lid. If a general container lid, which is free of an information transmission member, is configured to be retrofittable with an outer lid member provided with an information transmission member, such conveniences that purchasers can know product information or the like will be provided.

Information transmission members for information display, authenticity determination, etc. include IC chips, holograms, and so on.

An object of the present invention is therefore to provide, in connection with an information transmission member-equipped external member (outer lid member) to be put on a container lid, an external member for a container lid, which is versatile, which can be retrofitted even if the dimensions of the container lid or a container are somewhat different, and which enables the opening of the container lid and the destruction of an information transmission member to be carried out by a series of simple and easy operations involving only rotating motions.

Means for Solving the Problems

To attain the above-mentioned object, an external member for a container lid according to the present invention is one comprising: an opening/closing cover which covers an upper surface and an outer peripheral surface of the container lid, which can be opened sideways, and which has a locking section formed on an inner peripheral surface thereof for restraining an upper movement thereof by engaging the container lid or a container when the opening/closing cover is in a closed state; an outer cover which covers an upper surface and at least an upper side of an outer peripheral surface of the opening/closing cover, and which has a tamper-evident bottom section to be locked by a restraint section of the opening/closing cover when the opening/closing cover is in the closed state; and an information transmission member to be mounted on one of the opening/closing cover and the outer cover, wherein the tamper-evident bottom section is cut off upon rotational movement of the opening/closing cover and the outer cover relative to each other, whereby the outer cover is separated from the opening/closing cover, and the opening/closing cover is opened sideways to make the opening/closing cover detachable from the container lid.

The information transmission member of the external member for the container lid is provided on an upper surface of a top panel of the opening/closing cover, a cutter is provided on a lower surface of a top plate of the outer cover, and the opening/closing cover is raised toward the top plate, whereupon a predetermined site of the information transmission member can be destroyed by the cutter.

The opening/closing cover of the external member for the container lid includes a top panel covering the upper surface of the container lid, and a peripheral wall extending downwardly from an outer peripheral part of the top panel to cover the peripheral surface of the container lid; a hinge portion extending vertically is formed in a partial peripheral wall part of the peripheral wall; and the opening/closing cover can be rendered openable sideways via the hinge portion.

A separating section where the opening/closing cover is separated vertically into upper and lower parts is formed in the peripheral wall of the opening/closing cover of the external member for the container lid; separating means, which break the separating section through the rotational movement to separate the opening/closing cover vertically into the upper and lower parts, and which widen a spacing between the upper and lower parts of the separated opening/closing cover in a vertical direction, are formed on the outer peripheral surface of the opening/closing cover and on an inner peripheral surface of the outer cover; and the vertically separated opening/closing cover widens a spacing between broken parts of the separating section, whereby the tamper-evident bottom section can be cut off.

The separating means of the external member for the container lid bring the top panel and the top plate relatively close to each other before breakage of the opening/closing cover, whereby the cutter can destroy the information transmission member.

The separating means of the external member for the container lid are a protrusion formed on the inner peripheral surface of the outer cover and a guide surface formed on the outer peripheral surface of the opening/closing cover; and the guide surface can be formed to be inclined or curved from the position of the protrusion toward a circumferentially lower side of the opening/closing cover.

A guide section for widening the spacing between the broken parts of the separating section of the opening/closing cover in collaboration with the separating means in accordance with the rotational movement can be formed in the separating section of the opening/closing cover of the external member for the container lid.

The authenticity determination member of the external member for the container lid is preferably an IC tag or a hologram.

The external member for a container lid according to the present invention is an opening/closing cover which includes a top panel covering an upper surface of the container lid, and a peripheral wall extending downwardly from an outer peripheral part of the top panel to cover the peripheral surface of the container lid; which has a vertically extending hinge portion formed in a partial peripheral wall part of the peripheral wall, whereby the opening/closing cover can open sideways about the hinge portion as a rotation center; and which has a locking section formed on the inner peripheral surface of the peripheral wall, the locking section engaging the container lid or a container when the opening/closing cover is in a closed state.

The sideways opening of the opening/closing cover includes a case where the opening/closing cover opens sideways via the hinge provided, and a case where the opening/closing cover opens sideways while being divided into two parts.

Effects of the Invention

The external member for a container lid according to the present invention is an external member mounted with an IC tag, and can be retrofitted, after completion of a product, to a container lid of a container free of an information transmission member. With the external member, a single motion for reversely rotating the outer cover and the opening/closing cover relative to each other enables an arbitrary site of the IC tag to be destroyed, and also enables the outer cover and the opening/closing cover to be detached. Since a configuration composed of the outer cover and the opening/closing cover alone is adopted, moreover, the number of the components can be cut down.

MODE FOR CARRYING OUT THE INVENTION

An external member for a container lid in an embodiment of the present invention will be described by reference to the accompanying drawings.

Figure 1:
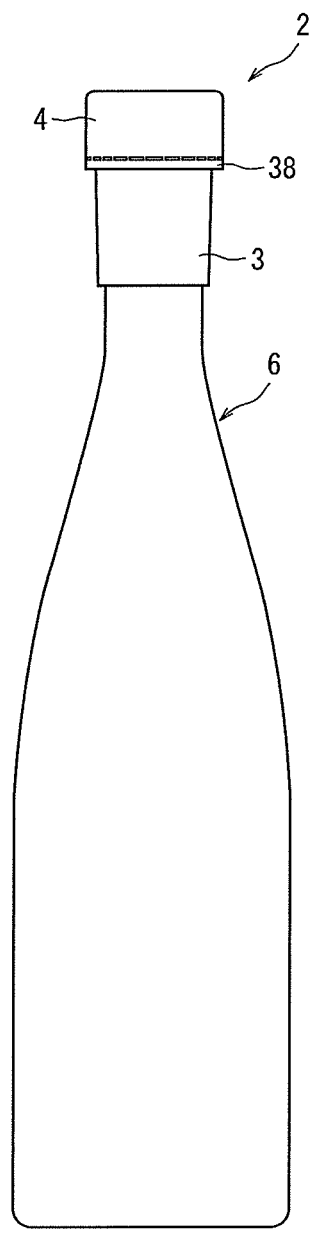
FIG. 1 is an entire front view of a container mounted with an external member for a container lid according to an embodiment of the present invention.
Figure 2:
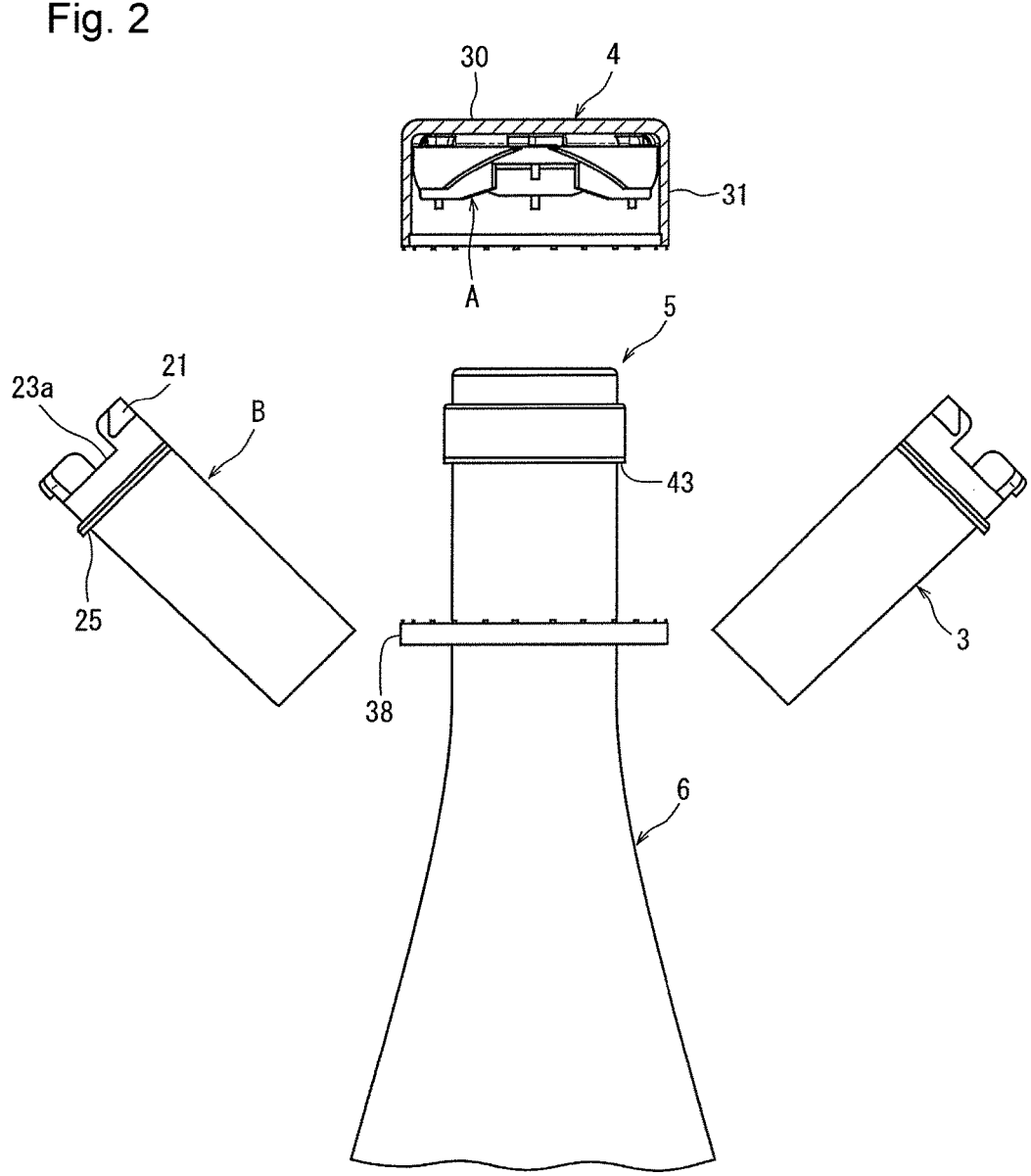
FIG. 2 is a front view showing a state in which the external member is removed from the container fitted with the container lid in FIG. 1 (however, an outer cover is indicated in a sectional view, and an opening/closing cover is indicated with a hinge being cut).
Figure 3:
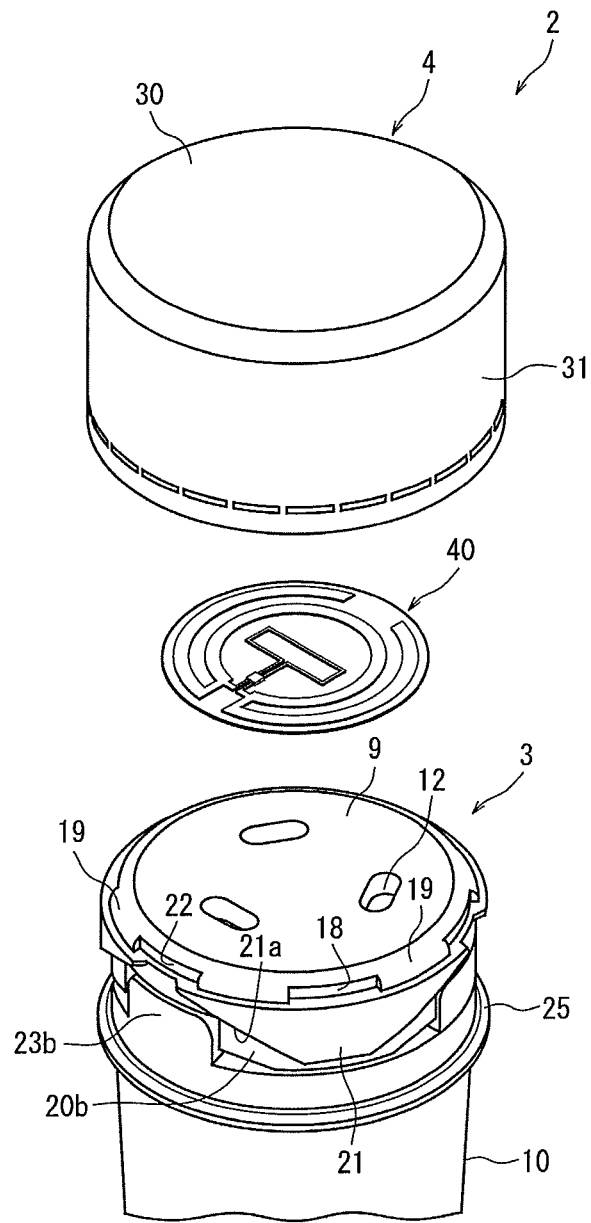
FIG. 3 is a perspective view of a state in which the external member for a container lid in FIG. 1 is disassembled into the opening/closing cover, an IC tag, and the outer cover.
Figure 4:
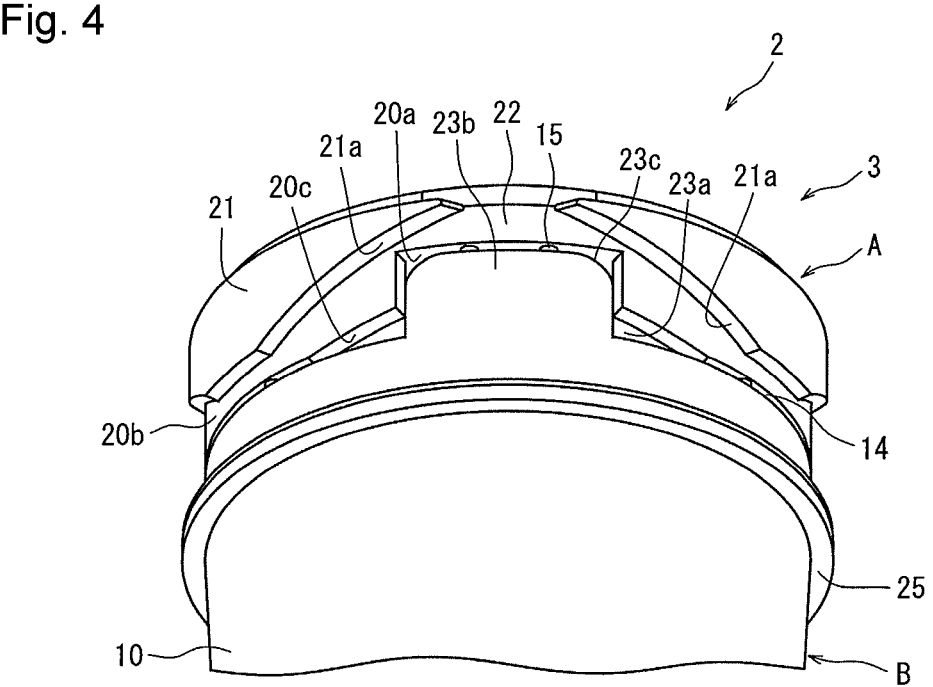
FIG. 4 is a perspective view in which the upper side of the opening/closing cover in FIG. 3 is viewed from an obliquely downward direction.
Figure 5:
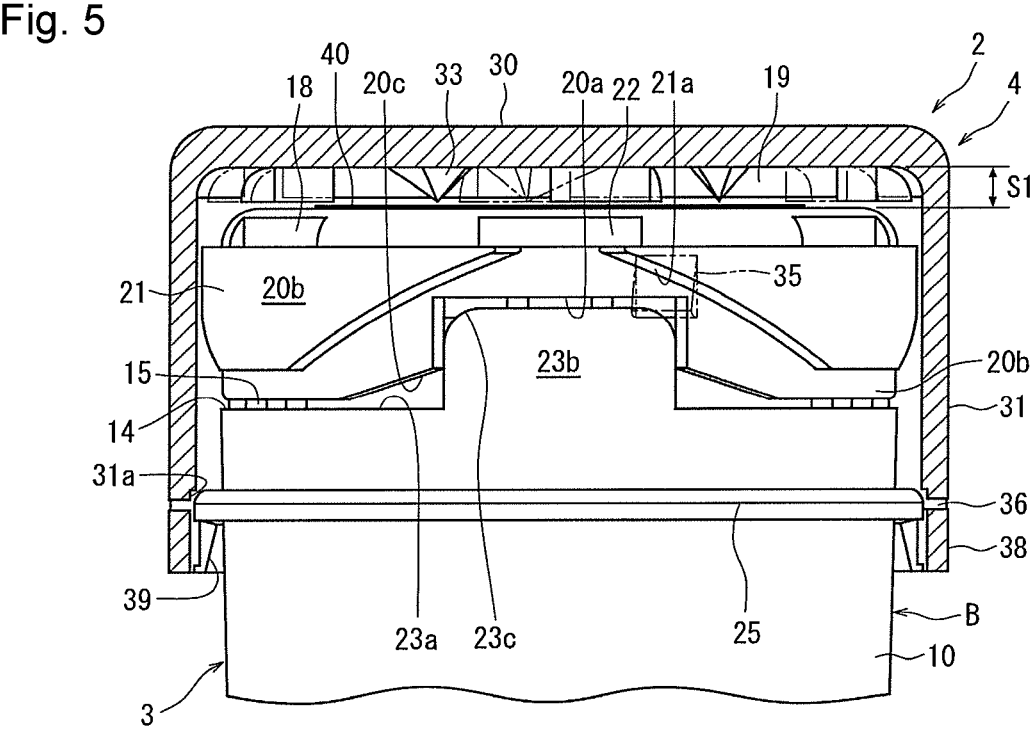
FIG. 5 is a front view of the external member for a container lid, in which the external member comprises the opening/closing cover and the outer cover mounted on the opening/closing cover, with the outer cover being indicated in section.

FIG. 1 is a front view of a state in which a container lid 5 of a container 6 is capped with an external member 2. FIG. 2 is an exploded front view of a state in which the external member 2 is separated from the container 6 (an opening/closing cover 3 is cut into two parts). FIG. 3 is an exploded perspective view of the external member 2 and an IC tag 40, with the opening/closing cover 3 being closed. FIG. 4 is a perspective view of the upper side of the opening/closing cover 3 as viewed from an obliquely downward direction. FIG. 5 is a front view of the external member, with the outer cover being indicated in section.

The external member 2 for a container lid according to the present invention is mounted on the outside of the container lid 5 put on the container, and can be used to retrofit the container lid 5 with the IC tag 40 or a hologram 51 (see FIGS. 13, 14) as an information transmission member for use in authenticity determination or information display.

Figure 6:
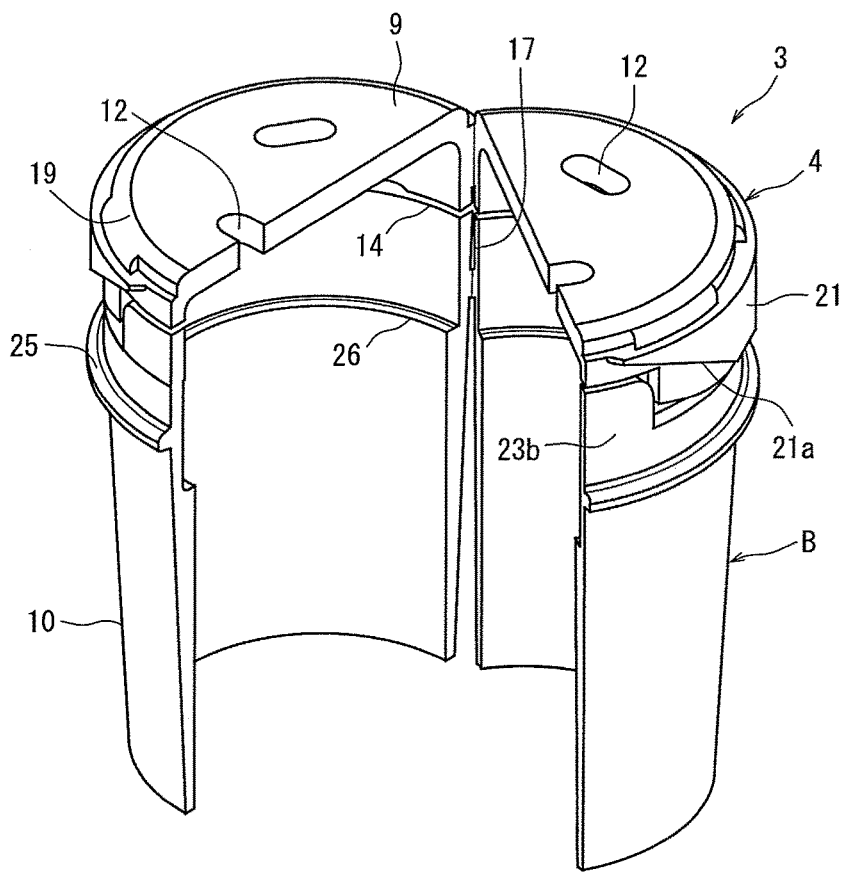
FIG. 6 is a perspective view of the opening/closing cover opened sideways and viewed from an obliquely upward direction.

With reference to FIGS. 1 to 5, the external member 2 comprising synthetic resin is composed of the opening/closing cover 3 and an outer cover 4. The opening/closing cover 3 includes a top panel 9, which covers the upper surface of the container lid 5 when placed on the container lid 5, and a peripheral wall 10 extending downward from an outer peripheral part of the top panel 9 to cover the peripheral surface of the container lid. As shown in FIG. 6, the opening/closing cover 3 can be opened and closed sideways on a hinge 17, but initially will be explained in a closed state.

The top panel 9 of the opening/closing cover 3 is disk-shaped, and has three downwardly concave elliptic holes 12 formed at nearly intermediate positions in the radial direction. The three elliptic holes 12 are each in an elliptic shape, and are formed 120 degrees apart in the circumferential direction. Each of the elliptic holes 12 may be a through-hole or in the shape of a bottomed groove.

In an outer peripheral part of the top panel 9, positioning grooves 22, fitting grooves 18, and stopper sections 19 are formed. The positioning grooves 22 are designed to position protrusions 35 formed on the inner peripheral surface of the outer cover 4 (see FIG. 8) to be described later, while the fitting grooves 18 are designed to be fitted with spacers 32 formed in the outer cover 4.

Details of the spacer 32 and the protrusion 35 will be offered later.

By reference to FIG. 5, in particular, the peripheral wall 10 of the opening/closing cover 3 is cylindrical and, on its upper side, there is formed a separating section 14, a fragile part for separating the opening/closing cover 3 into an upper body A on the upper side and a lower body B on the lower side. The upper body A and the lower body B are coupled together by a plurality of columnar bridging sections 15 (see FIGS. 4, 5), and slits are defined between the bridging sections 15. By exerting an external force in a vertical (or oblique) direction, therefore, the bridging portions 15 are cut.

Figure 7:
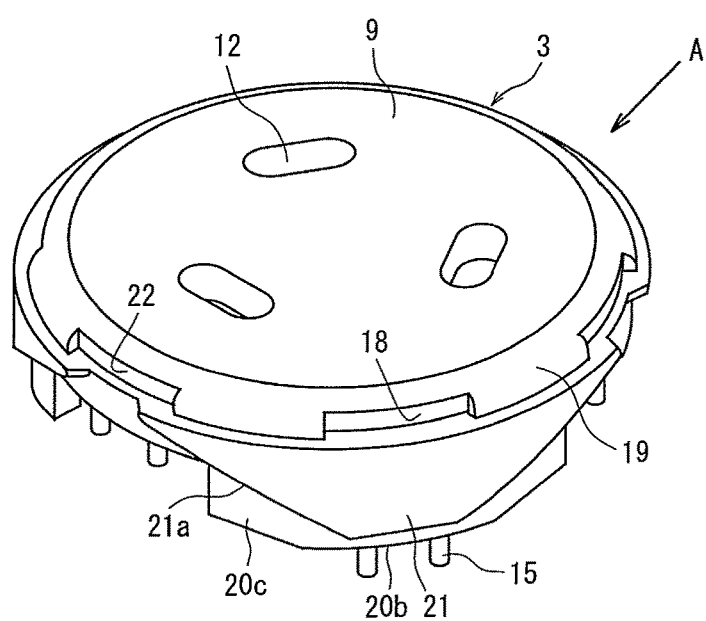
FIG. 7 is a perspective view of an upper body of the opening/closing cover of FIG. 3 viewed from an obliquely upward direction.

FIG. 7 illustrates only the upper body A of the opening/closing cover 3 upon cutting of the separating section 14. The side of the upper body A facing the peripheral wall 10 is in an irregular shape formed with convexities 20b projecting downward and concavities 20a between the convexities 20b. At the right and left ends on the leading (lower) end side of the convexity 20b, notched sections 20c are formed so as to incline downward toward the central side of the convexity 20b.

In the upper body A, moreover, thick-walled guide sections 21 are formed at 3 locations 120 degrees apart, and the positioning grooves 22 are formed between the guide sections 21. Each of the guide sections 21 protrudes radially outwardly from a reference surface on the outer peripheral surface side of the peripheral wall 10. In detail, the guide sections 21 are in an inversely trapezoidal shape, and are bilaterally symmetrical with respect to the circumferential central position of the convexity 20b. The oblique side of the guide section 21 defines a downward guide surface 21a which inclines (or curves) from the positioning groove 22 obliquely downwardly in the circumferential direction of the peripheral wall 10. Such guide surfaces 21a are formed at 6 locations, on the right and left end sides in the circumferential direction of the positioning grooves 22.

The lower body B has an irregular shape in which on the upper end side, upwardly projecting convexities 23b are formed at 3 locations with equal spacing, and concavities 23a are formed between the adjacent convexities 23b. The convexity 23b is located inside the concavity 20a of the upper body A, the convexity 20b is located inside the concavity 23a, and they are coupled by the aforementioned bridging sections 15. At the right and left ends on the upper side of the convexity 23b, curved guide sections 23c are formed.

In an outer peripheral part of the lower body B, an annular restraint section 25 is formed which protrudes radially outwardly. The restraint section 25 is locked by flaps 39 (see FIGS. 5, 8) formed in a tamper-evident bottom section 38 of the outer cover 4. A region of the opening/closing cover 3 below the restraint section 25 is formed to be gradually decreased in diameter.

By reference to FIG. 6, a locking section 26 provided with a step is formed on the inner peripheral surface of the lower body B, and a side of the inner peripheral surface above the locking section 26 is thin-walled, while a side of the inner peripheral surface below the locking section 26 is thick-walled. The location where the locking section 26 is formed is such that the upward stepped surface of the locking section 26 is located directly below a downward lower end surface 43 of the cylindrical wall of the container lid 5 (see FIG. 2). Alternatively, if there is an annular ring, a so-called neck ring, on the container side, the locking section 26 may be located on the lower surface of the annular ring.

Such an opening/closing cover 3 can open sideways. That is, the hinge 17 composed of a thin-walled portion is formed to range from a part of the peripheral wall 10 above the locking section 26 to a part of the peripheral wall 10 below the top panel 9. Cuts are formed in a part of the opening/closing cover 3 below the hinge 17, a part in the diametrical direction of the top panel 9 in a region connecting the center of the top panel 9 to the hinge 17, and parts in the vertical direction of the peripheral wall 10 opposing the diametrical direction of the top panel 9 with respect to the hinge 17, whereby the opening/closing cover 3 can be opened sideways about the hinge 17 as a pivot center.

Figure 8:
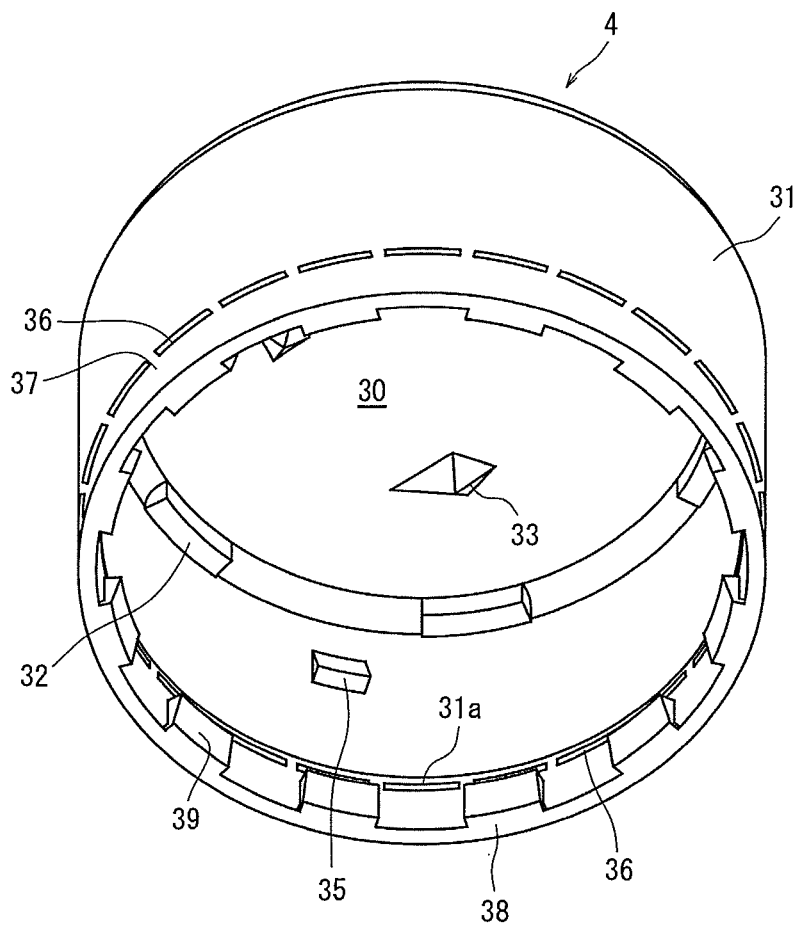
FIG. 8 is a perspective view of the outer cover in FIG. 2 viewed from an obliquely downward direction.

As shown in FIG. 8, the outer cover 4 includes a disk-shaped top plate 30, and a skirt wall 31 extending downward from an outer peripheral part of the top plate 30. The outer cover 4 covers the upper side of the opening/closing cover 3, with the opening/closing cover 3 being closed, and a spacer 32 is formed in a boundary region between the top plate 30 and the inner peripheral surface of the skirt wall 31 of the outer cover 4. The spacers 32 are formed at 6 locations with equal angular spacing in the circumferential direction of the top plate 30, and protrude downwardly of the lower surface of the top plate 30. Thus, when the outer cover 4 is placed on the opening/closing cover 3, a gap is formed between the top panel 9 and the top plate 30 in an amount corresponding to the thickness of the spacer 32.

Cutters 33 are formed at 3 locations in the circumferential direction of the top plate 30 on the lower surface of the top plate 30 of the outer cover 4 (in FIG. 8, that only at one location is shown). The cutters 33 are provided in correspondence with the positions of the elliptic holes 12 (FIG. 3) formed in the top panel 9 of the opening/closing cover 3, and the cutters are inserted into the elliptic holes 12 so that the IC tag 40 (FIG. 3) can be destroyed.

On the inner peripheral surface of the outer cover 4, protrusions 35 protruding radially inwardly are formed at 3 locations at equal intervals in the circumferential direction. The protrusions 35 can be inserted into the positioning grooves 22, and the height of formation of the protrusion 35 is important. That is, it is necessary that with the outer cover 4 being put on the opening/closing cover 3, the protrusion 35 be located at the same height as the upper end position of the guide surface 21a (FIG. 4) and, during rotation of the outer cover 4, the protrusion 35 be guided by the guide surface 21a. The guide surface 21a and the protrusion 35 constitute a separating means for breaking the separating section 14.

In a lower part of the skirt wall 31 of the outer cover 4, slits 36 are formed in the circumferential direction, and bridges 37 are formed between the slits 36. Below the slits 36, a tamper-evident bottom section 38 is formed. In the lower part of the skirt wall 31, stepped sections 31a are formed, and the inner diameter of the outer cover 4 is slightly increased in a lower part below the stepped sections 31a. In a lower end part on the inner peripheral surface side of the tamper-evident bottom section 38, many flaps 39 are formed which extend upward from the lower end and whose leading ends slightly protrude radially inwardly. As shown in FIG. 5, with the outer cover 4 being put on the opening/closing cover 3, the flaps 39 are bent in the vertical direction when passing over the restraint section 25 of the opening/closing cover 3. When the flaps 39 have climbed over the restraint section 25, the leading ends of the flaps 39 are returned inwardly by elastic force to contact the lower surface of the restraint section 25.

Figure 9:
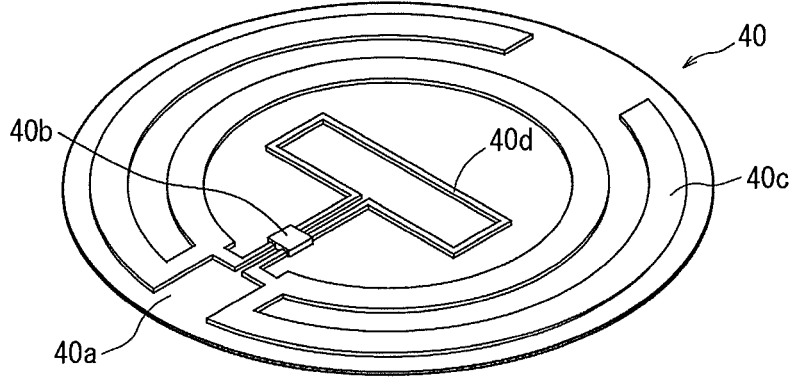
FIG. 9 is a perspective view of the IC tag according to the embodiment of FIG. 3.
Figure 10:
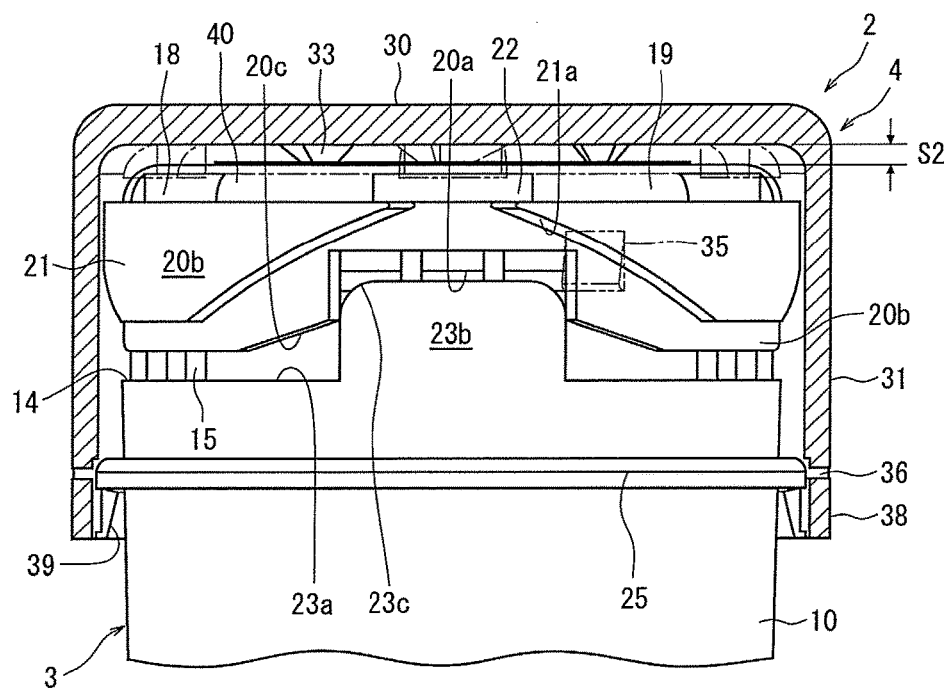
FIG. 10 is a front view of a state in which the IC tag of the external member for the container lid in FIG. 5 is destroyed (the outer cover is indicated in section).
Figure 11:
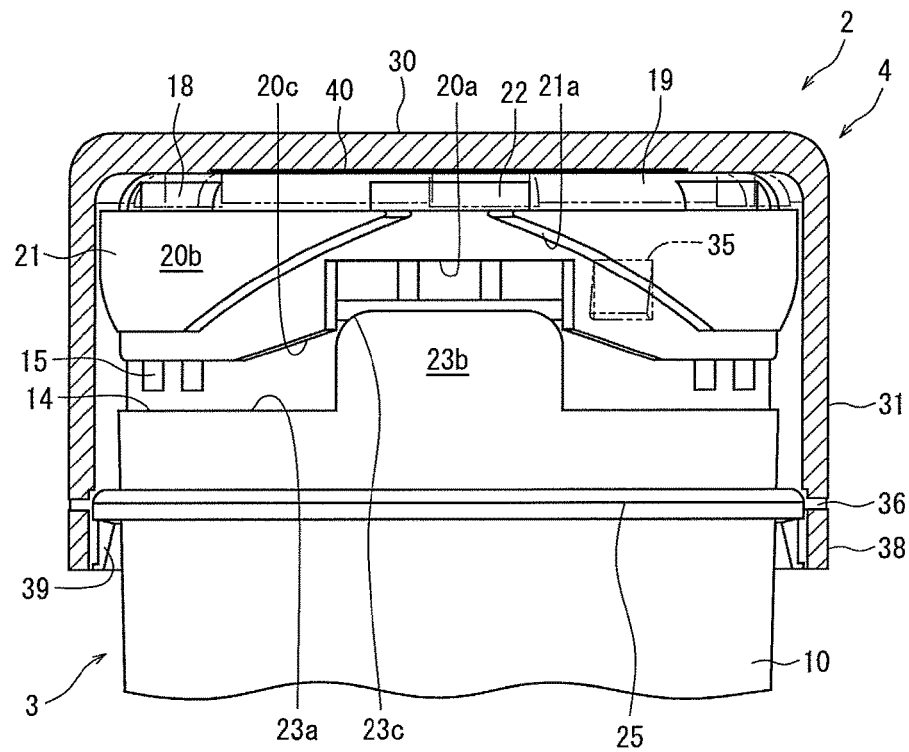
FIG. 11 is a front view of a state in which a separating section (bridging section) of the external member for the container lid in FIG. 10 has been broken (the outer cover is indicated in section).

FIG. 9 shows the film-shaped IC tag 40 to be pasted to the upper surface of the top panel 9 of the opening/closing cover 3. The IC tag 40 includes a circular thin resin film substrate 40a, an IC chip 40b having a recording medium, an antenna 40c for information transmission and reception which is connected to the IC chip 40b, and a lead wire 40d extracted similarly from the IC chip 40b.

The above IC chip 40b stores information on the contents filled into a packaging container (for example, producer, manufacturer, date of production, shipping date and time) and information on the container and campaigns, as stated earlier. Some of IC chips as the IC chip 40b are information rewritten, or are rewrite inhibited.

If the antenna 40c is destroyed, the IC tag 40 cannot make transmission to the reader. If the lead wire 40d is cut, on the other hand, transmission can be made via the antenna 40c. Thus, an electrical change is caused within the IC chip 40b between a state before cutting of the lead wire 40d and a state after cutting of the lead wire 40d, whereby recorded data can be modified, or only some of the recorded data can be transmitted.

When the antenna 40c is to be cut, for example, the position of the antenna 40c and the position of the cutter 33 are brought into agreement. When the lead wire 40d is to be cut, the position of the lead wire 40d and the position of the cutter 33 are brought into agreement.

Next, the mounting of the external member 2 on the container (or container lid) will be described.

The mounting of the external member 2 on the container includes the mounting of the opening/closing cover 3 on the container lid (container) and the capping of the opening/closing cover 3 with the outer cover 4. First, the mounting of the opening/closing cover 3 will be described.

[Mounting of Opening/Closing Cover]

The container lid 5 is put on the container 6, and neither the container 6 nor the container lid 5 is mounted with an information transmission member such as an IC tag.

To mount the external member 2 on the container lid-equipped container 6, the opening/closing cover 3 is opened sideways with the hinge 17 as an axis (the state of FIG. 6), and the opening/closing cover 3 is placed on the container 6 from the direction of the side of the container 6 (without dividing the opening/closing cover 3 into two parts as in FIG. 2). On this occasion, the locking section 26 (FIG. 6) of the opening/closing cover 3 is located below the lower end portion 43 (FIG. 2) of the cylindrical wall of the container lid 5, and the opening/closing cover 3 is closed. By so doing, the locking section 26 is regulated by the lower end portion 43 of the container lid 5, whereby the opening/closing cover 3 is restrained from moving upward. On the other hand, the downward movement of the opening/closing cover 3 is restrained, because the top panel 9 is regulated by the top surface of the container lid 5. In the closed state of the opening/closing cover 3, therefore, the opening/closing cover 3 does not slip off. When the opening/closing cover 3 is brought into a closed state, it is permissible to form a pawl in one of joining sections, form a recess in the other of the joining sections, and hook the pawl on the recess, thereby maintaining the closed state of the opening/closing cover 3, although this is not illustrated in the present embodiment.

Then, with the opening/closing cover 3 being closed, the IC tag 40 is pasted to the surface of the top panel 9. The IC tag 40 may be pasted only on its one side to a half of the top panel 9 of the opening/closing cover 3 halved, and another side of the IC tag 40 may be in a free state without being pasted. In this case, before the opening/closing cover 3 is mounted on the container 6, the IC tag 40 can be mounted on the top panel 9.

[Application of External Cover for Capping]

Then, the external cover 4 is applied as a cap.

By reference to FIGS. 3, 5 and 8, in performing capping, the first task is to align the external cover 4 with a predetermined position of the opening/closing cover 3. In detail, the three protrusions 35 on the inner peripheral surface of the outer cover 4 are positioned to reside on the side above the positioning grooves 22, and the outer cover 4 is lowered as such. As a result, each protrusion 35 enters the positioning groove 22, whereby the outer cover 4 can be mounted on the opening/closing cover 3. When the tamper-evident bottom section 38 of the outer cover 4 reaches the restraint section 25 of the opening/closing cover 3, the leading end side of the flap 39 opens outward (toward the inner peripheral surface of the outer cover). When the leading end of the flap 39 climbs over the restraint section 25, the leading end side of the flap 39 closes inward, whereupon the leading end of the flap 39 is locked to the lower part of the annular restraint section 25. In this manner, the outer cover 4 is prevented from slipping off the opening/closing cover 3, and the opening/closing cover 3 is prevented from opening sideways.

In this state of capping of the opening/closing cover 3 with the outer cover 4, the three protrusions 35 are located in the positioning grooves 22 as stated above. When the outer cover 4 is applied for capping and the shoulder of the restraint section 25 contacts the stepped section 31a of the outer cover 4, on the other hand, the downward movement of the outer cover 4 is restrained to form a gap S1 (see FIG. 5) between the top panel 9 and the top plate 30. Since this gap S1 is formed, the IC tag 40 disposed between the top panel 9 and the top plate 30 is not damaged. In this capping state, moreover, the cutters 33 of the outer cover 4 are located directly above the corresponding elliptical holes 12 (and the IC tag 40), and a clearance between the leading end of the cutter 33 and the IC tag 40 is small.

In this way, the outer member 2 for a container lid is mounted on the container 6 (or the container lid 5). Thus, a seller can mount the IC tag 40 by retrofitting onto a container which has not been mounted with an IC tag. The seller can read information stored in the IC chip 40 before and at the time of selling, while a purchaser can read the information with a reader or the like at the time of and after purchase.

Next, an explanation will be offered for the detachment of the external member 2 from the container 6 (or the container lid 5).

The detachment of the external member 2 from the container 6 can be performed by rotating the opening/closing cover 3 and the outer cover 4 relative to each other in the circumferential direction. The continuous execution of the destruction of the IC tag 40, the breakage of the separating section 14 between the upper body A and the lower body B, and the breakage of the tamper-evident bottom section 38 by such a single rotational motion is an important feature in the actions and effects of the present invention.

[Destruction of IC Tag]

The detachment of the outer cover 4 from the opening/closing cover 3 can be performed by rotating the opening/closing cover 3 and the outer cover 4 relative to each other in the circumferential direction, and the circumferential direction may be a rightward direction or a leftward direction.

Normally, with the opening/closing cover 3 being capped with the outer cover 4 (at the initial position), the protrusions 35 formed on the inner peripheral surface of the outer cover 4 are arranged in the positioning grooves 22 of the opening/closing cover 3. In this state, the thick-walled guide sections 21 are present on both sides of the protrusion 35. Thus, when the opening/closing cover 3 and the outer cover 4 are rotated relative to each other, the protrusion 35 contacts the guide surface 21a formed in the guide section 21.

When the opening/closing cover 3 and the outer cover 4 are reversely rotated relative to each other in the circumferential direction, the leading end of the inclined surface of the protrusion 35 enters below the guide surface 21a of one of the guide sections 21 located on the right and left sides, and then slides along the guide surface 21a. Since the guide surface 21a inclines circumferentially downwardly, the upper body A of the opening/closing cover 3 is raised toward the top plate 30, so that the bridging sections 15 stretch. At this time, the spacers 32 separate from the stopper sections 19 in the circumferential direction and enter the fitting grooves 18 or the positioning grooves 22. Thus, the top panel 9 can ascend until it touches the top plate 30.

At the same time, the cutters 33 enter the elliptical holes 12, and the IC tag 40 is destroyed by the cutters 33.

[Breakage of Separating Section (Bridging Section)]

When the opening/closing cover 3 and the outer cover 4 are further rotated in opposite directions, the protrusions 35 try to push upward the upper body A above the separating section 14 of the opening/closing cover 3. Since the flaps 39 of the tamper-evident bottom section 38 are locked to the restraint section 25, however, the further rotation of the opening/closing cover 3 and the outer cover 4 causes the bridging sections 15 between the upper body A and the lower body B to extend and eventually break. This breakage of the bridging sections 15 results in the separation of the upper body A and the lower body B from each other.

At this point in time, the spacers 32 are situated in the fitting grooves 18 or the positioning grooves 22.

Hence, the outer cover 4 and the upper body A can rotate in the same direction.

[Breakage of Bridges]

When, after breakage of the bridging sections 15, the opening/closing cover 3 and the outer cover 4 are further reversely rotated relative to each other in the circumferential direction, the notched sections 20c climb over the guide sections 23c and are guided thereby, whereupon the top panel 9 (upper body A) pushes the top plate 30 upward. When the top plate 30 is pushed up, load is concentrated on the bridges 37 of the tamper-evident bottom section 38, since the flaps 39 of the tamper-evident bottom section 38 are locked to the restraint section 25. Consequently, the bridges 37 are broken, so that the outer cover 4 can be detached.

Upon breakage of the bridges 37 and the tamper-evident bottom section 38, the outer cover 4 can be detached from the container 6, and the upper body A is removed while being accommodated within the outer cover 4. The tamper-evident bottom section 38 can be removed together with the outer cover 4, if a part of the tamper-evident bottom section 38 remains connected to the outer cover 4. The lower body B can be opened sideways about the hinge 17 as a rotation center, and can be easily released from the container lid 5 and the container 6.

As described above, the external member 2 for a container lid according to the present embodiment can be detached by a mere relative rotational motion of the opening/closing cover 3 and the outer cover 4.

In this state, the upper body A remains accommodated, as such, within the outer cover 4, because the spacers 32 are fitted in the fitting grooves 18 or the positioning grooves 22, with the result that the upper body A cannot rotate relative to the outer cover 4. Thus, the upper body A and the outer cover 4 do not allow the IC tag 40 to be exposed to the outside.

As described above, the external member 2 has the IC tag 40 mounted therein. Thus, a producer or the like can record information, such as the production date, production plant, or expiration date of the contents within the container 6, in the IC tag 40. Furthermore, it is recommendable to record an identification number inherent in each product (for example, a number in the 1000s, 2000s, 3000s and so on). If a fake external member is illegally mounted and does not correspond with an identification number (a faked product is discovered at a rate of 999/1000), for example, this product can be confirmed to be a fake. If two or more products with the same identification number appear, moreover, attention can be called to the fact that fake products are distributed. Such an inherent identification number is effective particularly for containers of high-class alcoholic beverages, such as brandies and wines, and name-brand products, such as perfumes, whose fakes tend to appear, because the authenticity of the products can be judged from the identification number.

A purchaser or the like can confirm various pieces of production information with the use of a reader, such as a mobile phone, at the time of or after purchase of the product. In such a case as the destruction of the antenna 40c by the cutter 33, however, product information cannot be known after unsealing of the external member 2.

In a case where the lead wire 40d is cut, without cutting of the antenna 40c, on the other hand, a user can read data from the IC chip 40b even thereafter, because the antenna 40c remains connected. Hence, data unnecessary to the user may be electrically removed at the time of cutting the lead wire 40d. Alternatively, after cutting of the lead wire 40d, information such as one on a winning number in a lottery concerned with the product may be displayed.

The external member 2 according to the present invention, in particular, can be retrofitted after the container 6 is capped with the container lid 5. Thus, the external member 2 is convenient to use, because it can be easily retrofitted, if details of a campaign are worked out subsequently or a change or the like is made in the campaign information.

Figure 12:
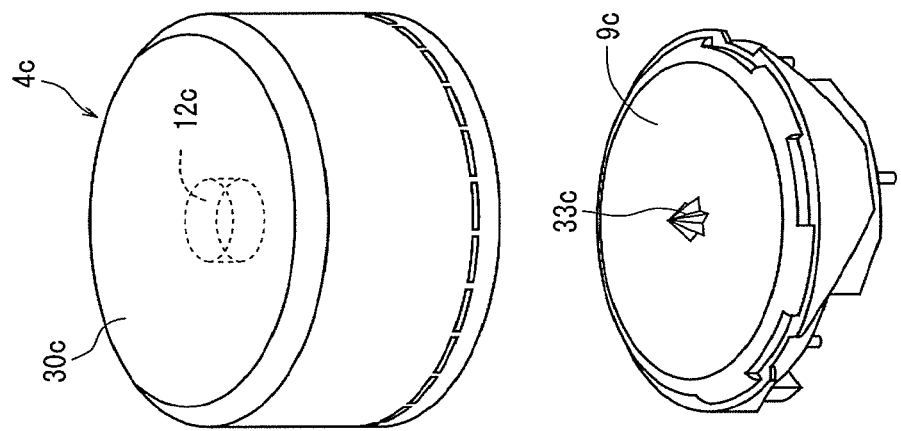
FIGS. 12A to 12C are perspective views of the outer cover and the opening/closing cover as modifications of the external member for the container lid according to the present invention, as viewed from above, 12A showing an example in which cutters and slots to be fitted with the cutters are formed inversely, 12B showing an example in which a cutter is disposed at the center of the outer cover, and 12C showing an example in which a cutter is disposed at the center of the opening/closing cover.
Figure 12:
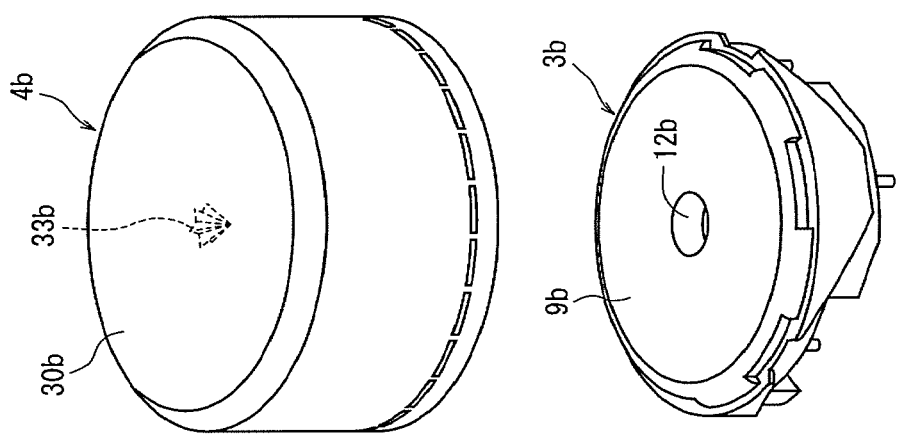
Figure 12:
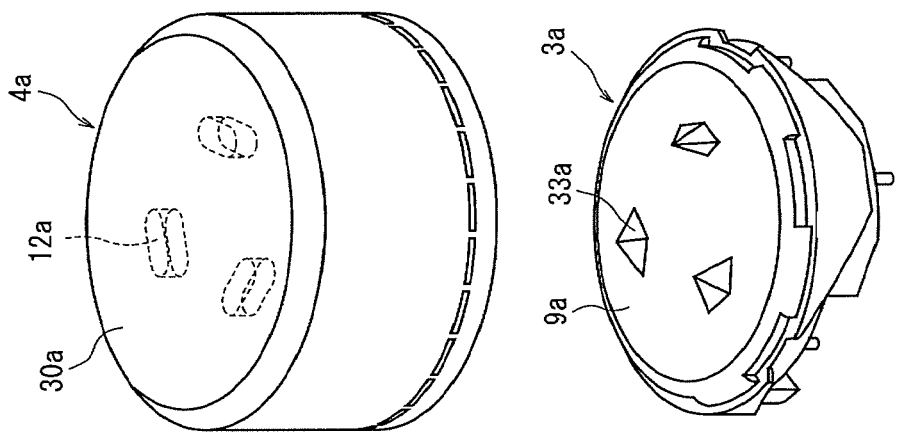

FIGS. 12A to 12C show modifications of the external member for a container lid.

In the above-described embodiment, the IC tag (hologram) is provided on the top panel 9 of the opening/closing cover 3, the elliptical holes 12 are formed in the top panel 9, and the cutters 33 are formed in the top plate 30 of the outer cover 4. However, these constituent members can be changed, as appropriate, in conformity with the shape or position of the IC tag 40 (or hologram).

As shown in FIG. 12A, three cutters 33a may be formed with equal spacing in the circumferential direction of a top panel 9a on the upper surface of the top panel 9a of an opening/closing cover 3a, and elliptical holes 12a may be formed at positions of the inner surface of a top plate 30a of an outer cover 4a corresponding to the cutters 33a.

Alternatively, as shown in FIG. 12B, a circular hole 12b may be formed at the center of the upper surface of a top panel 9b of an opening/closing cover 3b, and a cutter 33b may be formed at a position of the inner surface of a top plate 30b of an outer cover 4b corresponding to the circular hole 12b.

Alternatively, as shown in FIG. 12C, a cutter 33c may be formed at the center of the upper surface of a top panel 9c of an opening/closing cover 3c, and a circular hole 12c may be formed at a position of the inner surface of a top plate 30c of an outer cover 4c corresponding to the cutter 33c.

Other features of the external members for a container lid in FIGS. 12A to 12C are the same as those in the above-described embodiment.

Figure 13:
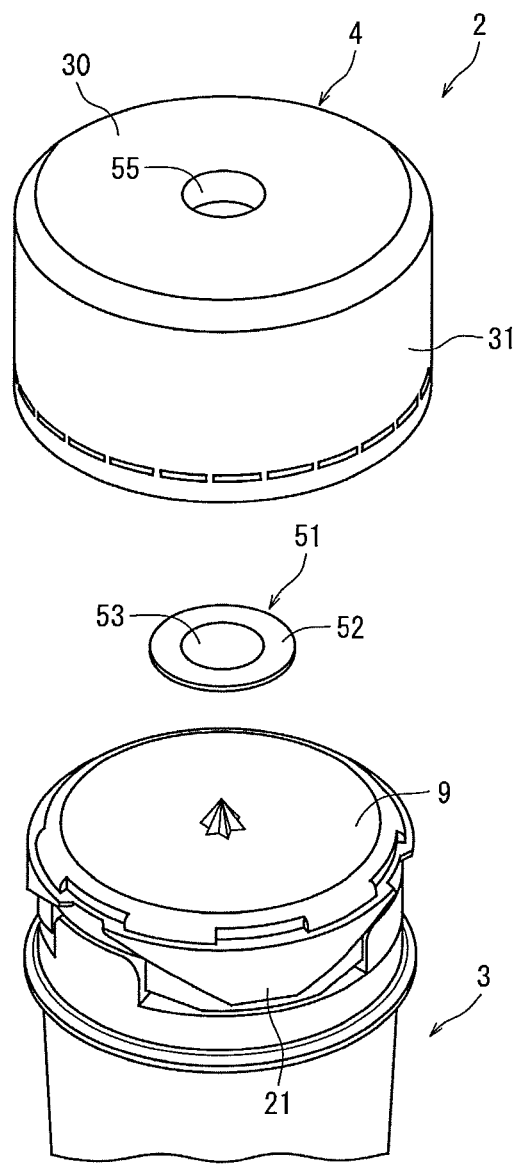
FIG. 13 is an exploded perspective view of an example in which an information transmission member of the external member for the container lid according to the present invention is formed into a hologram.
Figure 14:
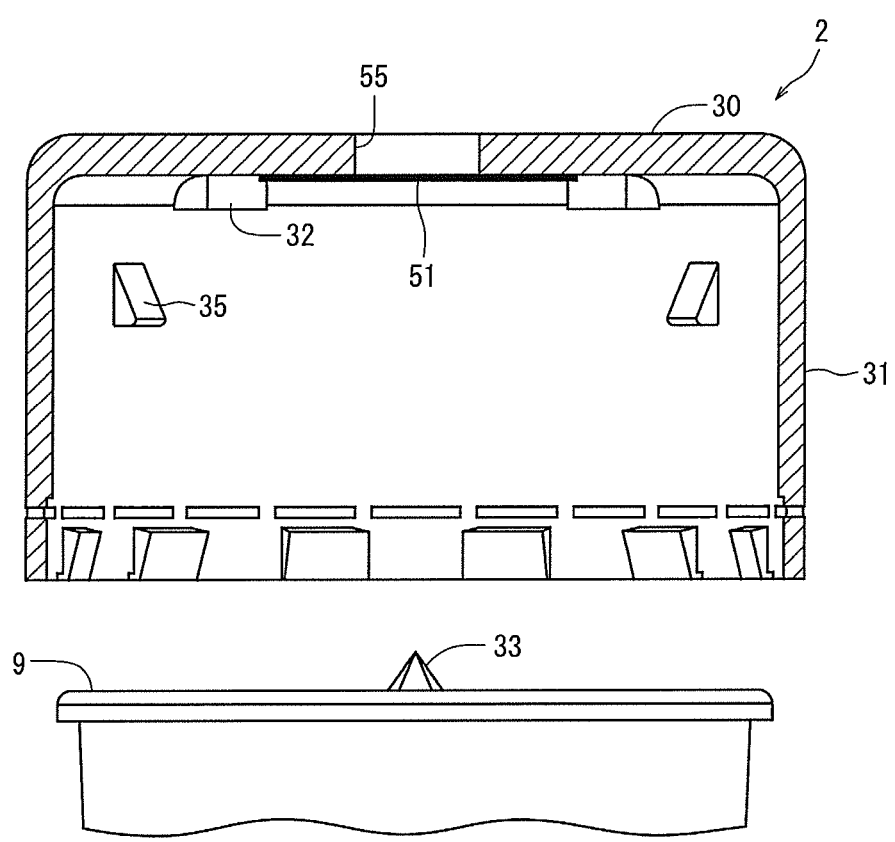
FIG. 14 is a sectional view of the external member for the container lid of FIG. 13 as viewed from a side surface direction.

FIGS. 13 and 14 show an example in which a hologram is mounted instead of the IC tag as an information disclosure member (components of the same names as those in the above embodiment are assigned the same numerals as those in the embodiment). A hologram 51 has an image region 53 provided in the middle of a hologram film 52, the image region 53 being formed as a hologram layer in the hologram film 52. The hologram layer is formed in a predetermined pattern of fine depressions arranged in the image region 53 by such a means as casting, embossing, laser processing, or photoresist, and exhibits a hologram image upon diffraction of light. With such a hologram 51, the hologram image disappears when the image region 53 is destroyed.

To mount the hologram 51, a peephole 55 which is a through-hole is formed at the center of the top plate 30 of the outer cover 4. The hologram 51 is attached to the inner surface of the top plate 30 of the outer cover 4 by fitting, adhesion or the like, and is disposed so that the image region 53 is visible through the peephole 55.

In the opening/closing cover 3, on the other hand, a cutter 33 protruding upward is formed in the center on the surface side of the top panel 9. In a state where the opening/closing cover 3 is capped with the outer cover 4, the cutter 33 is disposed directly below the hologram 51. When the outer cover 4 is detached from the opening/closing cover 3, the opening/closing cover 3 is relatively raised toward the outer cover 4, whereupon the cutter 33 destroys the image region 53 of the hologram 51. Because of this destruction, the user can acquire information as to whether the cover member has been opened.

The present invention has been described in detail above based on its embodiment by reference to the accompanying drawings. It is to be noted, however, that the present invention is in no way limited to the above embodiment (and the modifications), and other changes or modifications can be made without departing from the scope of the invention.

For example, the guide surfaces 21a of the guide section 21 formed in the opening/closing cover 3 are formed on the right and left sides in the circumferential direction of the positioning groove 22, but the guide surface 21a may be formed on one of the right and left sides. In this case, the detachment of the opening/closing cover 3 is carried out on only one of the right and left sides in the circumferential direction.

The opening/closing cover 3 is integrally formed using the hinge 17, but may be divided into two halves, with the hinge 17 being omitted. That is, the site of the hinge 17 of the opening/closing cover 3 shown in FIG. 6 may be eliminated, and the opening/closing cover 3 may be configured to be openable sideways in a divided state, as shown in FIG. 2. However, the integration of the opening/closing cover 3 using hinge connection is advantageous in that the number of the components can be decreased to two (if the shape of the opening/closing cover is symmetric, its right-hand and left-hand components are in common with each other and pose no problem; if they are asymmetric, however, the number of the components is increased).

Moreover, the opening/closing cover 3 is formed of the upper body A and the lower body B, and when the outer cover 4 is detached from the opening/closing cover 3, the upper body A and the lower body B are cut. The IC tag 40 (hologram 51) can be destroyed, without need to cut the upper body A and the lower body B. With such a structure, however, the spacers 32 of the outer cover 4 are fitted in the fitting grooves 18. Thus, the relative rotation of the outer cover 4 and the opening/closing cover 3 cannot be made. As a result, these covers 3 and 4 are integrated, the opening/closing cover 3 cannot be opened sideways, and these covers 3, 4 cannot be detached from the container 8. In order that the opening/closing cover 3 and the outer cover 4 can be rotated relative to each other, it is advisable to withdraw the spacer 32 from the fitting groove 18 upon rotation, for example, by imparting to the spacer 32 a triangular shape having an inclined surface in the bottom shape of the spacer 32.

According to the present embodiment, the information transmission member is destroyed by the cutter. However, the information transmission member may be mounted, as such, on the opening/closing cover without being destroyed so that the information of the IC chip can be confirmed.

EXPLANATIONS OF LETTERS OR NUMERALS

2 External member
3 Opening/closing cover
4 Outer cover
5 Container lid
6 Container
9 Top panel
10 Peripheral wall
12 Elliptical hole
14 Separating section
15 Bridging section
17 Hinge 18 Fitting groove
19 Stopper section
20b Convexity of upper body
21 Guide section
21a Guide surface (separating means)
22 Positioning groove
23b Convexity of lower body
23c Guide section
25 Restraint section
26 Locking section
30 Top plate
31 Skirt wall
32 Spacer
33 Cutter
35 Protrusion (separating means)
37 Bridge
38 Tamper-evident bottom section
39 Flap
40 IC tag
A Upper body
B Lower body

The invention claimed is:

1. An external member for a container lid, comprising: an opening/closing cover which covers an upper surface and an outer peripheral surface of the container lid, which can be opened sideways, and which has a locking section formed on an inner peripheral surface thereof for restraining an upper movement thereof by engaging the container lid or a container when the opening/closing cover is in a closed state;
an outer cover which covers an upper surface and at least an upper side of an outer peripheral surface of the opening/closing cover, and which has a tamper-evident bottom section to be locked by a restraint section of the opening/closing cover when the opening/closing cover is in the closed state; and
an information transmission member to be mounted on one of the opening/closing cover and the outer cover,
wherein the tamper-evident bottom section is cut off upon rotational movement of the opening/closing cover and the outer cover relative to each other, whereby the outer cover is separated from the opening/closing cover, and the opening/closing cover is opened sideways to make the opening/closing cover detachable from the container lid, and wherein
a separating section where the opening/closing cover is separated vertically into upper and lower parts is formed in a peripheral wall of the opening/closing cover,
separating means, which break the separating section through the rotational movement to separate the opening/closing cover vertically into the upper and lower parts, and which widen a spacing between the upper and lower parts of the separated opening/closing cover in a vertical direction, are formed on the outer peripheral surface of the opening/closing cover and on an inner peripheral surface of the outer cover, and
the vertically separated opening/closing cover widens a spacing between broken parts of the separating section, whereby the tamper-evident bottom section is cut off.

2. The external member for a container lid according to claim 1, wherein
the information transmission member is provided on an upper surface of a top panel of the opening/closing cover,
a cutter is provided on a lower surface of a top plate of the outer cover, and
the opening/closing cover is raised toward the top plate, whereupon a predetermined site of the information transmission member is destroyed by the cutter.

3. The external member for a container lid according to claim 1, wherein
the opening/closing cover includes a top panel covering the upper surface of the container lid, and a peripheral wall extending downwardly from an outer peripheral part of the top panel to cover a peripheral surface of the container lid,
a hinge portion extending vertically is formed in a partial peripheral wall part of the peripheral wall, and
the opening/closing cover is openable sideways via the hinge portion.

4. The external member for a container lid according to claim 1, wherein
the separating means bring the top panel and the top plate relatively close to each other before breakage of the opening/closing cover, whereby the cutter destroys the information transmission member.

5. The external member for a container lid according to claim 1, wherein
the separating means are a protrusion formed on the inner peripheral surface of the outer cover and a guide surface formed on the outer peripheral surface of the opening/closing cover, and
the guide surface is formed to be inclined or curved from a position of the protrusion toward a circumferentially lower side of the opening/closing cover.

6. The external member for a container lid according to claim 1, wherein
a guide section for widening the spacing between the broken parts of the separating section of the opening/closing cover in collaboration with the separating means in accordance with the rotational movement is formed in the separating section of the opening/closing cover.

7. The external member for a container lid according to claim 1, wherein
the information transmission member is an IC tag.

8. An external member for a container lid, comprising: an opening/closing cover which covers an upper surface and an outer peripheral surface of the container lid, which can be opened sideways, and which has a locking section formed on an inner peripheral surface thereof for restraining an upper movement thereof by engaging the container lid or a container when the opening/closing cover is in a closed state;
an outer cover which covers an upper surface and at least an upper side of an outer peripheral surface of the opening/closing cover, and which has a tamper-evident bottom section to be locked by a restraint section of the opening/closing cover when the opening/closing cover is in the closed state; and
an information transmission member to be mounted on one of the opening/closing cover and the outer cover,
wherein the tamper-evident bottom section is cut off upon rotational movement of the opening/closing cover and the outer cover relative to each other, whereby the outer cover is separated from the opening/closing cover, and the opening/closing cover is opened sideways to make the opening/closing cover detachable from the container lid, and wherein
the information transmission member is provided on an upper surface of a top panel of the opening/closing cover,
a cutter is provided on a lower surface of a top plate of the outer cover, and the opening/closing cover is raised toward the top plate, whereupon a predetermined site of the information transmission member is destroyed by the cutter.

9. The external member for a container lid according to claim 8, wherein the opening/closing cover includes a top panel covering the upper surface of the container lid, and a peripheral wall extending downwardly from an outer peripheral part of the top panel to cover a peripheral surface of the container lid, a hinge portion extending vertically is formed in a partial peripheral wall part of the peripheral wall, and the opening/closing cover is openable sideways via the hinge portion.

* * * * *